United States Patent

Tateisi et al.

[11] 3,855,735
[45] Dec. 24, 1974

[54] DIMENSIONAL CONTROL GAUGE FOR INTERNAL GRINDERS

[75] Inventors: Hiromiti Tateisi; Mituo Tamura, both of Iwata, Japan

[73] Assignee: Tokyo Bearing Manufacturing Company Limited, Osaka-shi, Japan

[22] Filed: Aug. 13, 1973

[21] Appl. No.: 387,660

[30] Foreign Application Priority Data
Dec. 18, 1970  Japan.................... 45/114385

Related U.S. Application Data

[63] Continuation of Ser. No. 140,366, May 5, 1971, abandoned.

[52] U.S. Cl............................. 51/165 R, 51/165.91
[51] Int. Cl............................................ B24b 49/04
[58] Field of Search........ 51/165 R, 165.91, 165.83, 51/165.93, 225

[56] References Cited
UNITED STATES PATENTS

| | | | |
|---|---|---|---|
| 1,861,233 | 5/1932 | Hutchinson | 51/165.93 |
| 1,919,615 | 7/1933 | Booth | 51/165.91 |
| 2,143,454 | 1/1939 | Schmidt | 51/165.93 |
| 2,437,783 | 3/1948 | Hutchinson | 51/165.93 X |
| 2,771,714 | 11/1956 | Schmidt | 51/165.91 |
| 2,772,519 | 12/1956 | Boyd | 51/165.83 X |
| 2,793,479 | 5/1957 | Arms | 51/165.91 X |
| 3,019,565 | 2/1962 | Hatstat | 51/165.91 |
| 3,030,744 | 4/1962 | Mueller | 51/225 |
| 3,156,075 | 11/1964 | Slayman | 51/165 R |
| 3,197,921 | 8/1965 | Hobler | 51/165.93 |

*Primary Examiner*—Harold D. Whitehead
*Attorney, Agent, or Firm*—Hall & Houghton

[57] ABSTRACT

Means for supporting a gauge for dimensional control in internal grinders are provided which comprises a support shaft for a gauge head mounted within a chuck spindle through the intermediary of hydrostatic bearings, and providing a measuring probe in contact with the inner surface of a workpiece during machining operation thereby carrying out the measurement of the surface being worked. An apparatus for supporting a gauge for dimensional control in internal grinders is also provided which is based on said method. Advantages and details therof will be made clear.

2 Claims, 5 Drawing Figures

PATENTED DEC 24 1974　　3,855,735

HIROMITI TATEISI,
MITNO TAMURA,
INVENTORS.

BY　Hall & Houghton
　　　Attorney.

DIMENSIONAL CONTROL GAUGE FOR INTERNAL GRINDERS

This is a continuation of application Ser. No. 140,366, filed May 5, 1971, now abandoned.

BACKGROUND OF THE INVENTION a. Field of the Invention

The present invention relates to apparatus for supporting a gauge for dimensional control in internal grinders.

b. Field of the Prior Art

Generally, grinding is an operation in which high accuracy is called for, and in the case of dimensional control, not only is it necessary to use a gauge which itself is highly accurate, but also adequate consideration should be given to the method of supporting the gauge.

Price known means for such gauges are shown in FIGS. 3 through 5.

In the apparatus shown in FIG. 3, a support portion 2 for a gauge 1 and a support portion 4 for a workpiece 3 are separate members spaced apart from each other. With this arrangement, the heat generated during grinding of the workpiece 3 by a grinding wheel 5 will be transmitted to the support portion 4 for the workpiece 3, but not to the support portion 2 for the gauge head 1. As a result, the conditions of thermal displacement of these two support portions 2 and 4 differ, and the difference in thermal displacement detracts from the accuracy of measurement.

In the apparatus shown in FIG. 4, a plug gauge 6 whose diameter is equal to the finished inner diameter of a workpiece 3 is repeatedly inserted in and withdrawn from the workpiece 3 during machining operation, and the operation will be brought to an end when the plug gauge 6 has been completely inserted in the workpiece 3. With this arrangement, however, machining by a grinding wheel 5 alternates with measurement by the plug gauge 6, resulting in poor accuracy of machining, and the errors arising from measurement due to wear of the plug gauge 6 cannot be overlooked.

In the apparatus shown in FIG. 4, a gauge head 1 is supported within a support spindle 4 for a workpiece 3 so as to be independent of the support spindle 4 and a plurality of measuring probes 7 bear against the surface of the workpiece 3 to carry out the measurement thereof. With this arrangement, however, since the support members for the gauge head 1 and workpiece 3 are independent of each other, the difference in thermal displaceeent detracts from the accuracy of machining as in the case of FIG. 3. Further, the use of the plurality of measuring probes 7 makes it necessary to alternate machining by a grinding wheel 5 with measurement by the measuring probes 7, which also detracts from the accuracy of machining.

SUMMARY OF THE INVENTION

According to the present invention, a gauge head supporting member is disposed within a support member for a workpiece to equalize thermal conditions for said support members as much as possible, thereby obviating any possible difference in their thermal displacements to keep their relative relation unchanged. Further, the gauge head supporting member is supported within the workpiece supporting member by means of hydrostatic bearings, thereby preventing the vibrations of the workpiece supporting member from being propagated to the gauge head supporting member. Moreover, a measuring probe is maintained in contact with the surface being worked, so that machining and measurement can be carried out at the same time.

BRIEF DESCRIPTION OF THE DRAWINGS

In the accompanying drawings.

DESCRIPTION OF THE PREFERRED EMBODIMENTS

Figure 1:
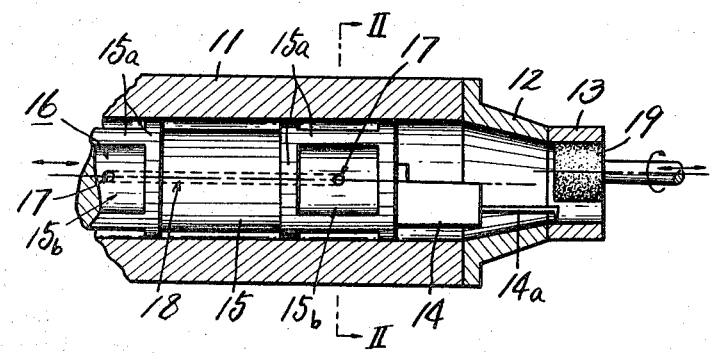
FIG. 1 is a side view, in longitudinal section, of the principal portion of the chuck of an internal grinder, showing an embodiment of the means for supporting a gauge according to the present invention.

In FIG. 1, the numeral 11 denotes a hollow chuck spindle; 12, a backing plate fixed to the front end of said chuck spindle; 13, a workpiece held by the backing plate 12; 14 a gauge head; and the numeral 15 denotes a support shaft for said gauge head.

The support shaft 15 has the gauge head 14 secured to the front end thereof and is supported within the chuck spindle 11 through the intermediary of a hydrostatic bearing 16 in such a manner that it is axially slidable but not rotatable.

The hydrostatic bearing 16 is so arranged that a plurality of recessed chambers 15b separated and defined by ridges 15a on the outer surface of the support shaft 15 are filled with lubricating oil at a predetermined pressure.

Figure 2:
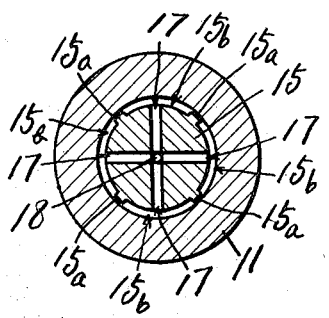
FIG. 2 is a section taken along the line II—II of FIG. 1.
Figure 3:
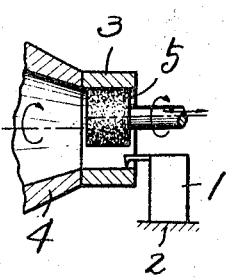
FIGS. 3 through 5 are schematic views showing conventional means for supporting a gauge.
Figure 4:
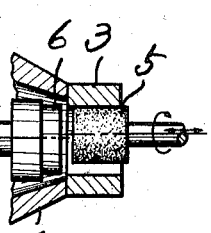
Figure 5:
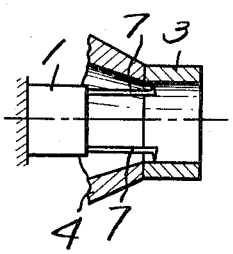

Each recessed chamber 15b, as shown in FIG. 2, is centrally bored with an oil hole 17 and these oil holes communicate with each other at the center of the support shaft 15 so that the lubricating oil pressures in said recessed chambers 15b are always balanced with each other.

Such hydrostatic bearings 16 are formed at a plurality of places spaced at suitable intervals axially of the support shaft 15 and these hydrostatic bearings communicate with each other through an oil hole 18 extending axially through the center of the support shaft 15 so that the lubricating oil pressures in the hydrostatic bearings at the respective places are always balanced with each other.

A device for axially reciprocatively sliding the support shaft 15 is attached to the latter at the rear end thereof, i.e., on the left-hand side as viewed in FIG. 1. This device is adapted to reciprocatively slide the support shaft 15 axially to the right or left within the chuck spindle 11 independently of the latter and prevent the support shaft 15 from being rotated.

Further, the chuck spindle 11 is constructed to be rotated at high speed by a motor located on the lefthand side as viewed in FIG. 1.

The gauge head 14 has a measuring probe 14a attached to the front end thereof. And it has means housed therein for sensitively detecting a slight movement of the measuring probe 14a.

The detecting means may be of any desired type provided that as soon as the detected value reaches a predetermined target value, it stops the grinding operation through an actuator lacated outside.

In actual grinding operation, the gauge head 14 along with the support shaft 15 is retracted to the left as viewed in FIG. 1 and stays in that position until the workpiece 13 is chucked to the backing plate 12 by any suitable method. Upon completion of the mounting of the workpiece 13, the gauge head is moved to the right to bring the measuring probe 14a into contact with the inner surface of the workpiece 13.

Subsequently, the grinding wheel 19 is rotated at high speed and inserted into the workpiece 13, and at the same time, the workpiece is rotated at high speed through the chuck spindle 13.

The grinding wheel 19 is reciprocated while being rotated to grind the inner surface of the workpiece 13. During internal grinding by the grinding wheel 19, the amount of grinding is detected by the gauge head 14 through the measuring probe 14a, and when the predetermined value is reached, a signal is emitted to bring the grinding operation to an end. During grinding operation, the gauge head 14 is not rotated within the chuck spindle 11 but is held stationary to carry out said detecting operation. In this case, since the gauge head 14 is supported by the support shaft 15 fitted in the central region of the chuck spindle 11 supporting the workpiece 13, there is no difference in thermal displacements of these support members. Therefore, the reference point of measurement dependent on such thermal displacement is always at a fixed position, remaining unchanged. As a result, the measurement of the amount of grinding of the workpiece 13 by the gauge head 14 is highly accurate Further, since the support shaft 15 for the gauge head 14 is supported through the hydrostatic bearings 16 with respect to the chuck spindle 11, it has a vibration-absorbing property. Moreover, since wear of the bearings can be prevented, the highly accurate measuring function of the gauge head 14 can be developed stably for a prolonged period of time.

Whiles there have been described herein what are at present considered preferred embodiments of the several features of the invention, it will be obvious to these skilled in the art that modifications and changes may be made without departing from the essence of the invention.

It is therefore to be understood that the exemplary embodiments thereof are illustrative and not restrictive of the invention, the scope of which is defined in the oppended claims and that all modifications that come within the meaning and range of equivalency of the claims are intenued to be included therein.

We claim:

1. Apparatus for supporting a gauge for dimensional control in internal grinders comprising a rotatable hollow chuck spindle having a backing plate at the front end thereof for receiving a workpiece to be internally ground by a rotatable grinding wheel opposed to the chuck spindle and axially reciprocable into and out of the workpiece, a gauge head supporting shaft mounted within said chuck spindle, a gauge head having measuring means mounted on the front end of said supporting shaft, said measuring means including a single feeler adapted to be in contact with the inner surface of the workpiece during machining operation to measure the radius thereof, axially spaced hydrostatic bearing means mounted within said chuck spindle and supporting said supporting shaft for axial movement coaxially within said chuck spindle whereby during a machining operation the measuring means of said gauge head will be maintained in contact with the inner surface of the workpiece being ground, said hydrostatic bearing means including a plurality of recessed chambers having an oil hole provided at the central portion of each of said recessed chambers, said oil holes being in communication with the center portion of said supporting shaft, the rotatable grinding wheel being in contact with the internal upper half surface of the workpiece being ground while said gauge head is in contact with the internal lower half surface of said workpiece.

2. An apparatus for supporting a gauge for dimensional control in internal grinders as set forth in claim 1, characterized in that the measuring means of said gauge head includes a plurality of feelers which are adapted to be axially moved in synchronism with the rotatable grinding wheel and maintained in contact with the inner surface of the workpiece during machining operation to measure the diameter thereof.

* * * * *

UNITED STATES PATENT OFFICE
CERTIFICATE OF CORRECTION

PATENT NO. : 3,855,735
DATED : December 24, 1974
INVENTOR(S) : Hiromiti Teteisi and Mituo Tamura It is certified that error appears in the above-identified patent and that said Letters Patent are hereby corrected as shown below:

In the Caption, item 73, for "Tokyo" read --Toyo--

Signed and sealed this 1st day of July 1975.

(SEAL)
Attest:

RUTH C. MASON
Attesting Officer

C. MARSHALL DANN
Commissioner of Patents
and Trademarks